United States Patent

[11] 3,596,259

[72] Inventors Hiroichi Teramura
Tokyo-to;
Naohiko Hattori, Tokyo-to; Sumitoshi
Ando, Ohmiya-shi, Saitama-ken, all of,
Japan

[21] Appl. No. 784,428
[22] Filed Dec. 17, 1968
[45] Patented July 27, 1971
[73] Assignee Kokusai Denshin Denwa Kabushiki Kaisha
Tokyo-to, Japan
[32] Priority Dec. 18, 1967
[33] Japan
[31] 42/80602

[54] DELAY SYSTEM OF SAMPLED SIGNALS USING A CIRCULATING MEMORY
4 Claims, 6 Drawing Figs.

[52] U.S. Cl. 340/173RC, 333/29
[51] Int. Cl. G11c 21/00
[50] Field of Search 340/173 RC; 333/29, 30

[56] References Cited

UNITED STATES PATENTS

| | | | |
|---|---|---|---|
| 3,065,304 | 11/1962 | Dawson | 340/173 |
| 3,387,284 | 6/1968 | Munson | 179/15 |
| 3,471,835 | 10/1969 | Gribble | 340/173 |

*Primary Examiner*—Terrell W. Fears
*Attorneys*—Robert E. Burns and Emmanuel J. Lobato

ABSTRACT: A system for delaying sampled signals including a circulating memory having a delay circuit in which the delay time unit is designed Td; a sampling circuit for producing a sampling pulse train having a period Ts, wherein Td and Ts are each equal to an integer-multiple of the duration of the sampled signal circulating in the circulating memory, and the delay time unit Td is not equal to an integer-multiple of the sampling period Ts; a read-right circuit for entering and withdrawing sampled pulses to and from the memory; an output circuit for receiving signals readout of the memory; and a control timing circuit for generating pulses to operate these various circuits. The sampled signals which are delayed by the circulating memory are derived from the circulating memory at least at predetermined times at each of which an integer-multiple of the delay time unit Ts and an integer-multiple of the sampled period Ts coincide with each other. The sampled signals delayed may be derived from the circulating memory at each of the predetermined times only, or at plural times a predetermined period from one of the predetermined times and the just succeeding one of the predetermined times.

DELAY SYSTEM OF SAMPLED SIGNALS USING A CIRCULATING MEMORY

This invention relates to a delay system of sampled signals and more particularly to a system for controlling the respective delay times of time-divisional sampled signals by use of a circulating memory so as to obtain delay times equal to plural times the delay time unit of the circulating memory.

There have been heretofore proposed many kinds of circulating memories of this type. If a serial-access memory, such as delay line, is employed in the circulating memory, time divisional pulses can be delayed, by delay times equal to plural times the delay time of the delay line, by reading out desired ones of delayed signals and by rewriting-in them in the delay line. However, many address memories and complicated timing controls are necessary to perform the above mentioned operations in the conventional circulating memory.

An object of this invention is to provide a delay system of sampling system using circulating memory capable of simplifying the timing operation of the writing-in and reading-out of desired signals.

Another object of this invention is to provide a delay system of sampled signals using a circulating memory in which time-divisional signals of a plurality of input channels can be delayed by different delay times.

The system of this invention is applied to obtain a delay time longer than the delay time unit Td of a circulating memory. In accordance with this invention, at least one input signal is sampled at a sampling period Ts and stored in the circulating memory. The delay time unit Td and the sampling period Ts are each determined so as to be an integer multiple of the duration of each of the sampled pulses and have the relationship Ts≠n.Ts where "n" is an integer.

The principle of this invention will be better understood from the following more detailed discussion taken in conjunction with the accompanying drawings, in which the same or equivalent parts are designated by the same reference numerals, characters and symbols, and in which.

Figure 1:
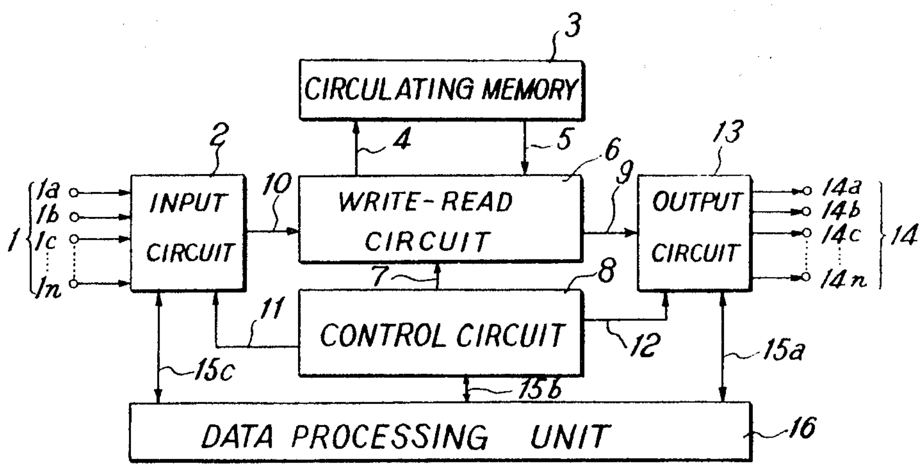
FIG. 1 is a block diagram for illustrating an embodiment of this invention.

With reference to FIG. 1, the principle of this invention will be described. Input signals of channels A, B, C, ...... applied from input terminals 1 (*1a*, *1b*, *1c*, .....) are time divisionally sampled successively at an input circuit 2 by use of a sampling pulse train supplied, through a line 11, from a control circuit 8. A write-read circuit 6 carries out the writing -in of the sampled signals in a circulating memory 3 and the reading out of the stored signals from the circulating memory as delayed signals. The control circuit 8 instructs the timing of this system. The input signals and the delayed signals may be processed at a data processing unit 16. An output circuit 13 is employed for sending out the delayed signals and the processed signals to output terminals 14 (*14a*, *14b*, *14c*,,.....).

The general operation of this system is as follows. The input signals sampled at the input circuit 2 is applied to the write-read circuit 6, which writes the sampled input signals in the circulating memory 3 through a line 8 under control of the control circuit 4. The stored signals are read out, after the delay time unit Td of the circulating memory 3, to the write-read circuit 6 through a line 5. If a readout signal is to be further delayed, the readout signal is again written-in in the circulating memory 3 through the line 4 under control of the control circuit 8. In a case where a readout signal has been delayed by a desired delay time, this readout signal is transferred to the output circuit 13. The control circuit 8 controls the input circuit 2, the write-read circuit 6 and the output circuit 13, so that the sampled input signals, the written signals and the readout signals do not interfere with one another in the write-read circuit 6.

The delay time unit Td of the circulating memory 3 and the sampling period Ts at the input circuit 2 have the relationship Td≠n.(Ts), where "n" is an integer, and are equal to an integer multiple of the duration $\tau$ of each of the sampled pulses in the circulating memory 3.

The operation of the control system of this invention is as follows:

Example 1

Figure 2:
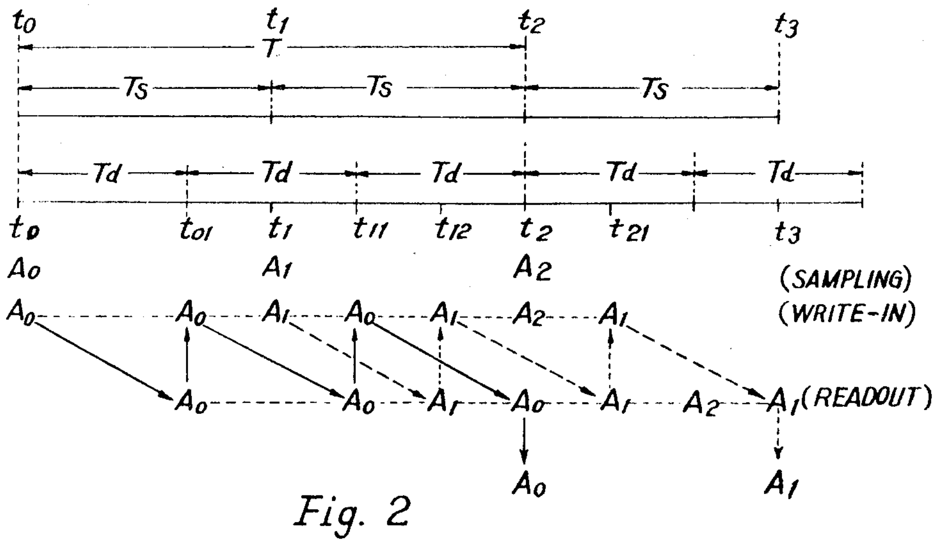
FIGS. 2 and 3 are time charts for describing examples of the operation of the system of this invention.

In this example, it is assumed that the sampling period Ts is longer than the delay time unit Td of the circulating memory 3. The operation of this example is described with reference to FIG. 2 in which the flow of information of an input channel A only is described for simple explanation.

The input signal of channel A is sampled at the sampling period Ts, so that sampled signals $A_0$, $A_1$, $A_2$, ..... obtained at respective sampling time slots $t_0$, $t_1$, $tt$,...are successively stored in the circulating memory 3 as mentioned above. The sotred signal $A_0$ is read out at a time $t_{01}$ from the circulating memory 3 after the delay time unit Td, from the sampled-and-stored time $t_0$. However, since this time $t_{01}$ does not coincide with the sampling time slot of this channel A, the readout signal $A_0$ is again stored in the circulating memory 3. The signal $A_o$ read out after three delay time units 3(Td), from the written-in time $t_o$ is transferred to the output circuit 13 since this readout time $t_2$ coincides with the sampling time slot of the channel A. A signal $A_2$ sampled at this time $t_2$ is stored to an empty memory space from which the signal $A_o$ has been read out. A signal $A_1$ sampled at a time $t_1$ which is the just succeeding sampling-time slot of the time $t_o$ is read out at a time $t_3$ after twice rewriting at times $t_{12}$ and $t_{21}$.

In actual cases, other channels are time-divisionally sampled successively during the period Ts. However, these sampling time slots of other channels are not shown in FIG. 2 for simple illustration.

Figure 4:
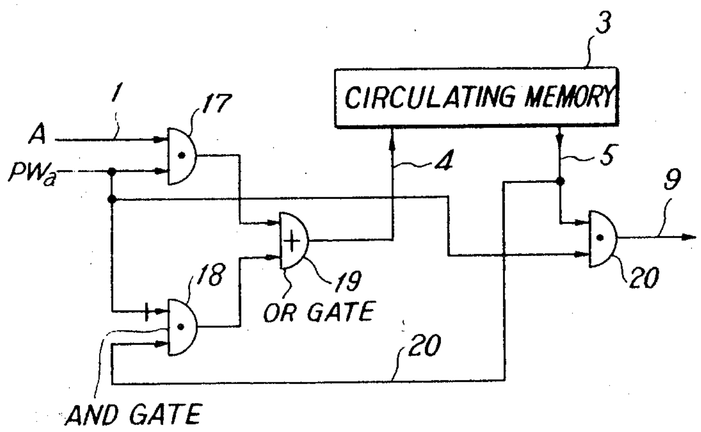
FIG. 4 is a connection diagram illustrating an example of circuitry comprising an input circuit, a circulating memory, a write-read circuit, and an output circuit, used in the embodiment shown in FIG. 1 for performing the operations shown in FIGS. 2 and 3.

FIG. 4 shows a circuitry of writing-in and reading-out to perform the above-mentioned operation with respect to an input channel A only. The signal of the channel A is sampled at an AND gate 17 by use of a sampling pulse train PWa of sampling period Ts, so that sampled signals $A_o$, $A_1$, $A_2$,.... passes through an OR gate 19 so as to be written-in in the circulating memory 3. The signal $A_o$stored at a time $t_o$ is read out at the readout line 5 at the time $t_{o1}$ after the delay time unit Td and applied to an AND gate 18. However, since any pulse of the pulse train PWa is not applied to the AND gate 17 at this time $t_{o1}$, the readout signal $A_o$ is again stored in the circulating memory 3 through the AND gate 18 opened and the OR gate 19. At the time $t_1$, the sampled signal $A_1$ is stored in the circulating memory 3 through the OR gate 19 and the line 4. At a time $t_{11}$, the signal $A_o$ is again stored as mentioned above. When the signal $A_o$ is read out at a time $t_2$, the sampled signal $A_2$ is stored through the OR gate 19 and the line 4, and the readout signal $A_o$ is sent out through an AND gate 20 opened by a pulse of the pulse train PWa. The signal $A_1$ is readout at a time $t_3$ after twice storing at times $t_{12}$ and $t_{21}$. In this example, the same pulse train Pwa is applied to the AND gates 17 and 20. However, it is allowable that different pulse trains are respectively applied to these AND gates 17 and 20 unless the stored signals $A_o$, $A_1$, $A_2$,.... do not interfere with one another.

Example 2

Figure 3:
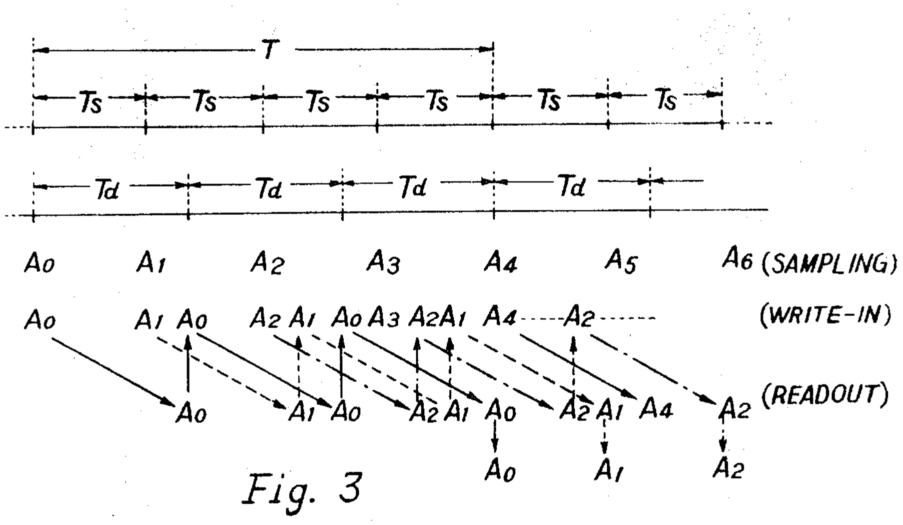

FIG. 3 shows another example of operation where the sampling period Td is shorter than the delay time unit Ts of the circulating memory 3. Since this operation can be understood on the analogy of the operation described with reference to FIG. 2, details are omitted.

Example 3

Figure 5:
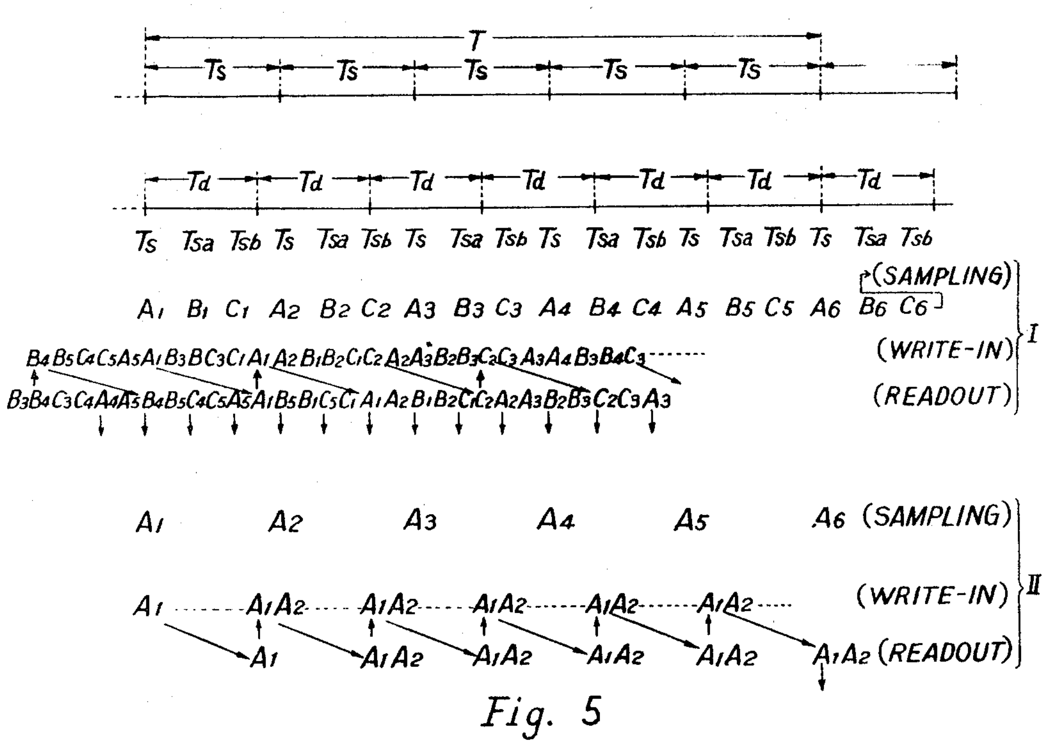
FIG. 5 shows time charts for describing another example of the operation of the system of this invention.

FIG. 5 shows another example of operation where a period T is a duration equal to the least common multiple (L.C.M.) of the delay time unit Ts and the sampling period Ts. Accordingly, the sampling of an input channel (e.g.; channel A) and the readout of stored signal of the same channel (i.e.; channel A) can be substantially simultaneously carried out at a period T. In this case, the same signal (e.g.; signal $A_1$) may be repeatedly written-in at T/Ts times (i.e.; five times in this FIG. 5) so as to obtain a delay time T. In this time T, the read-write circuit 6 has T/Ts times accesses to the same memory space of the circulating memory 3. Accordingly, if the maximum delay time T is not necessary but a delay time shorter delay time is desirable, a signal can be readout before the delay time T so that another signal can be stored to the readout space so as to delay by a shorter delay time than the time T.

In other words for more concrete explanation, FIG. 5 shows a case where 5 Ts=6 Td. If the operation described at the Examples 2 and 3 is applied to this case, a delay time T equal to six times the delay time unit Td will be obtained as illustrated in time charts II in FIG. 5. However, if three sampling pulse trains Pwa, Pwb, and Pwc generated at sampling time slots Ts, Tsa and Tsb are employed for sampling three channels A, B and C respectively, respective sampled pulses ($A_1$, $B_1$, $C_1$, $A_2$, $B_2$,....) can be delayed by twice the delay time unit Td as illustrated in time charts I in FIG. 5. Accordingly, the number of channels delayed becomes three times by decreasing the delay time to one third in compared with the foresaid Examples 1 and 2.

Figure 6:
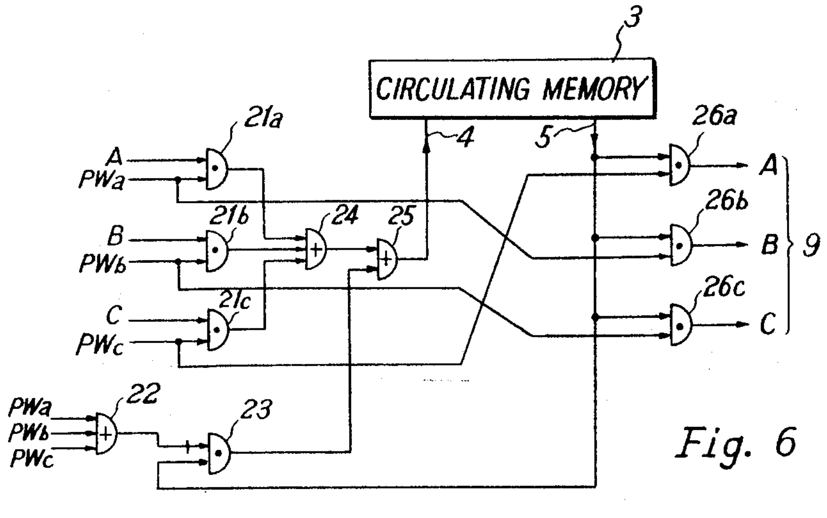
FIG. 6 is a connection diagram illustrating an example of circuitry comprising an input circuit, a circulating memory, a write-read circuit, an output circuit, used in the embodiment shown in FIG. 1 for performing the operation shown in FIG. 5.

An example of the circuitry for performing the operation of the Example 3 is shown in FIG. 6. Details are omitted since the operation of this circuitry an be understood on the analogy of the operation described with reference to FIG. 2.

In the above description, the delay line is referred as the circulating memory 3. However, this circulating memory 3 may be a core memory of serial-access type or a circulating shift register. It will be further understood that this invention can be applied to delay sampled signals of both digital channels and analogue channels.

What we claim is:

1. A system for delaying sampled signals obtained by sampling the signal of at least one input channel by use of at least one sampling pulse train, comprising: sampling circuit means for sampling an information signal, said sampling circuit means including means for generating sampling pulses having a period Ts therebetween and having a predetermined sampling duration for each period Ts; a circulating memory for storing said sampled information signal, said circulating memory having an input terminal and an output terminal, and having delay means connected between said input and output terminals; output circuit means for generating delayed information signals; write-read circuit means having a write circuit means connected to said sampling circuit means and said input terminal of said memory, and having read circuit means connected to said output terminal of said memory and to said output circuit means; control circuit means for generating timing signals, said control circuit means being connected to said sampling circuit means, said write-read circuit means, and said output circuit means for causing said time period Ts and said sampling duration time to have relationships with said time period Td, wherein Ts n Td, where n is an integer, and wherein each Ts and Td is a different integer-multiple of said sampling duration time; and means connected to said output circuit means for triggering said output circuit means to generate said delayed information signals at least at predetermined times when Td and Ts coincide.

2. A delay system according to claim 1, in which said means connected to said output circuit means comprises means for triggering said output circuit means to generate said delayed signals at each of the predetermined times only.

3. A delay system according to claim 1, in which said means connected to said output circuit means comprises means for triggering said output circuit means to generate said delayed signals at plural times during a predetermined period from one of the predetermined times and the just succeeding one of the predetermined times, whereby the same memory space allocated in the circulating memory are used to delay a plurality of sampled signals in the predetermined period.

4. A delay system according to claim 3, in which the predetermined period is equal to the least common multiple of the delay time unit Td and the sampling period Ts.